United States Patent
Wolff

(10) Patent No.: US 6,634,652 B1
(45) Date of Patent: Oct. 21, 2003

(54) NON-GALLING CHUCK

(75) Inventor: Irving B. K. Wolff, Portsmouth, VA (US)

(73) Assignee: Portsmouth Tool and Die, Portsmouth, VA (US)

( * ) Notice: Subject to any disclaimer, the term of this patent is extended or adjusted under 35 U.S.C. 154(b) by 149 days.

(21) Appl. No.: 09/977,839

(22) Filed: Oct. 15, 2001

(51) Int. Cl.[7] .............................................. B23B 31/171
(52) U.S. Cl. ........................ 279/74; 279/110; 279/121; 294/119.1; 901/36
(58) Field of Search .............................. 279/35, 37, 74, 279/110, 121, 122, 105–108, 55, 57; 294/115, 119.1, 106; 269/105, 153, 155; 901/31, 36–38; 82/126–127

(56) References Cited

U.S. PATENT DOCUMENTS

| | | | | |
|---|---|---|---|---|
| 206,591 A | * | 7/1878 | Mabie ........................ 279/35 |
| 4,744,596 A | * | 5/1988 | Hiller et al. ................. 294/115 |
| 5,836,633 A | * | 11/1998 | Svensson ..................... 294/115 |
| 6,530,578 B1 | * | 3/2003 | Svensson ..................... 279/106 |

* cited by examiner

*Primary Examiner*—Steven C. Bishop

(57) ABSTRACT

A gripping device that engages and disengages an inserted workpiece with an essentially perpendicular engagement action thereby eliminating any sliding contact with the workpiece. Such perpendicular and non-sliding engagement is achieved through the action of a plurality of gripping fingers driven by a spherical ball and hinged inside of a chuck housing that guides the fingers in a substantially perpendicular motion relative to the engaged surface during engagement and disengagement. Engagement with a workpiece is achieved by the simple action of compressing a spring retained outer casing and releasing the outer casing once the workpiece has been placed-within the gripping range of the internal fingers.

9 Claims, 3 Drawing Sheets

NON-GALLING CHUCK

FIELD OF THE INVENTION

The present invention relates to devices such as chucks for gripping workpieces and more particularly to such devices that are capable of gripping and releasing a workpiece such as a shaft without galling or otherwise marring the surface thereof.

BACKGROUND OF THE INVENTION

In many manufacturing processes workpiece handling equipment is used to move a part from one location to another or to hold or grip a part during a fabrication operation. In many cases, such as those involving gripping by a shaft during such manipulation, a chuck is used to first grip the shaft, hold the shaft during manipulation and then release the shaft for further fabrication or handling. Chucks commonly used to achieve such gripping rely on a sliding motion during the engagement and disengagement portions of the gripping operation. While such action is generally not a problem, for example, when a drill bit is inserted into a drill and the like, in some situations such sliding engagement is entirely unsatisfactory because the sliding action during engagement and disengagement results in marring, galling or otherwise affecting the surface of the engaged part. Such is the case, for example, in the handling of electric motor armatures and the like during the manufacturing and finishing processes associated with the fabrication of such devices. Even minimal surface damage to the armatures of such devices imparted during manufacture can affect the performance and durability of such devices.

Accordingly, the availability of a gripping device such as a chuck that can engage and disengage a workpiece such as an armature without damaging the surface thereof would be of significant benefit to the manufacturer of such devices.

OBJECTS OF THE INVENTION

It is therefore an object of the present invention to provide a gripping device capable of engaging and disengaging a shaft, armature or the like without damaging the surface thereof.

It is anther object of the present invention to provide an improved gripping device that can engage and disengage a shaft, armature or the like workpiece without any sliding contact that can adversely affect the surface of the engaged or disengaged shaft, armature or the like workpiece.

SUMMARY OF THE INVENTION

The present invention provides a gripping device that engages and disengages an inserted workpiece with an entirely perpendicular engagement action thereby totally eliminating any sliding contact with the workpiece. Such perpendicular and non-sliding engagement is achieved through the action of a plurality of gripping fingers driven by a spherical ball and hinged inside of a chuck housing that guides the fingers in a substantially perpendicular motion relative to the engaged surface during engagement and disengagement. Engagement with a workpiece is achieved by the simple action of compressing an outer casing and releasing the outer casing once the workpiece has been placed within the gripping range of the internal fingers.

DETAILED DESCRIPTION

In order to obtain a gripping device that is capable of tightly engaging a workpiece without any sliding motion such as that normally encountered in the use of conventional such gripping devices or chucks, it is necessary that all gripping motion, i.e. all motion by engagement surfaces or members be substantially perpendicular to the workpiece. The gripping device of the present invention achieves such perpendicular movement and consequently eliminates any damage to the gripped workpiece during engagement or disengagement with the gripping device. Such perpendicular movement is obtained through the action of a spherical ball driving against asymmetric recesses in the facing sides of gripping fingers that are slideably mounted within the gripping device.

Figure 4:
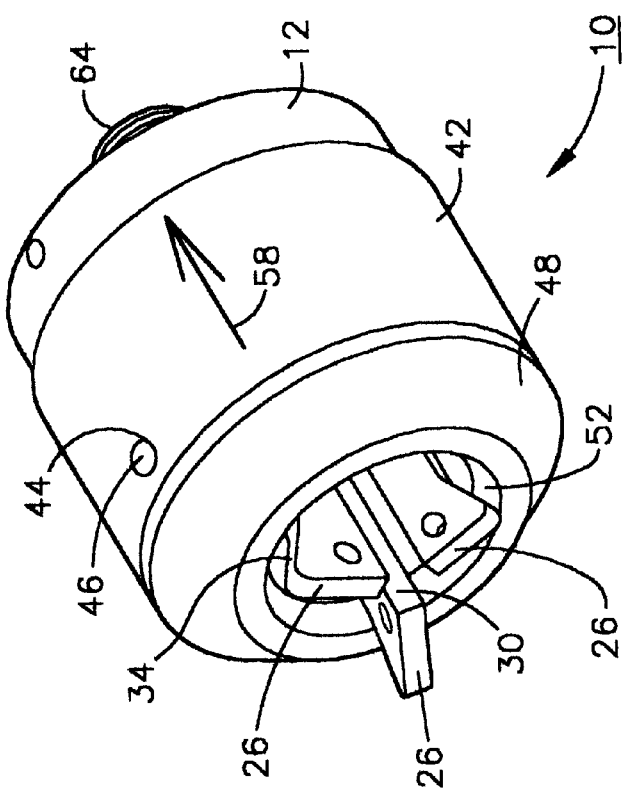
FIG. 4 is a perspective view of a preferred embodiment of the gripping device of the present invention in the open or releasing position.
Figure 1:
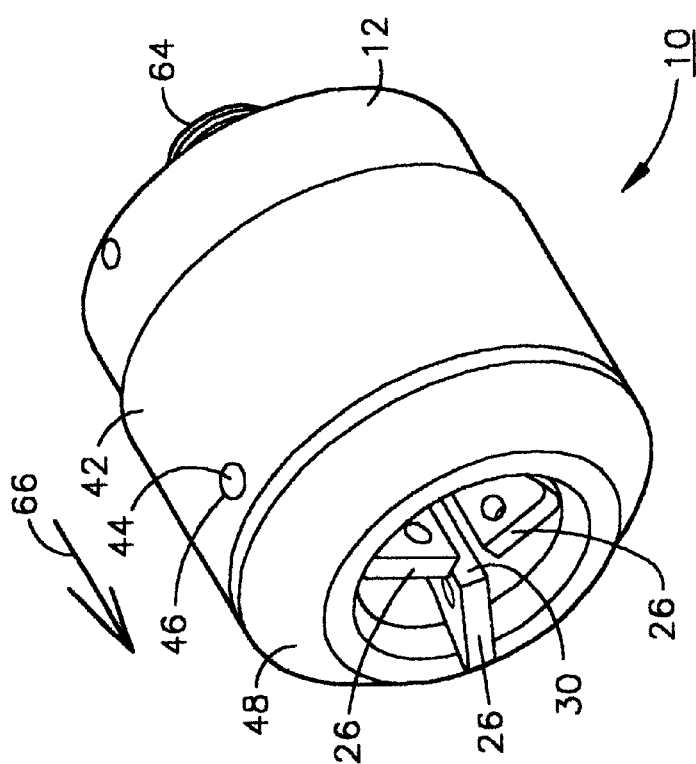
FIG. 1 is a perspective view of a preferred embodiment of the gripping device of the present invention in the closed or gripping position.
Figure 2:
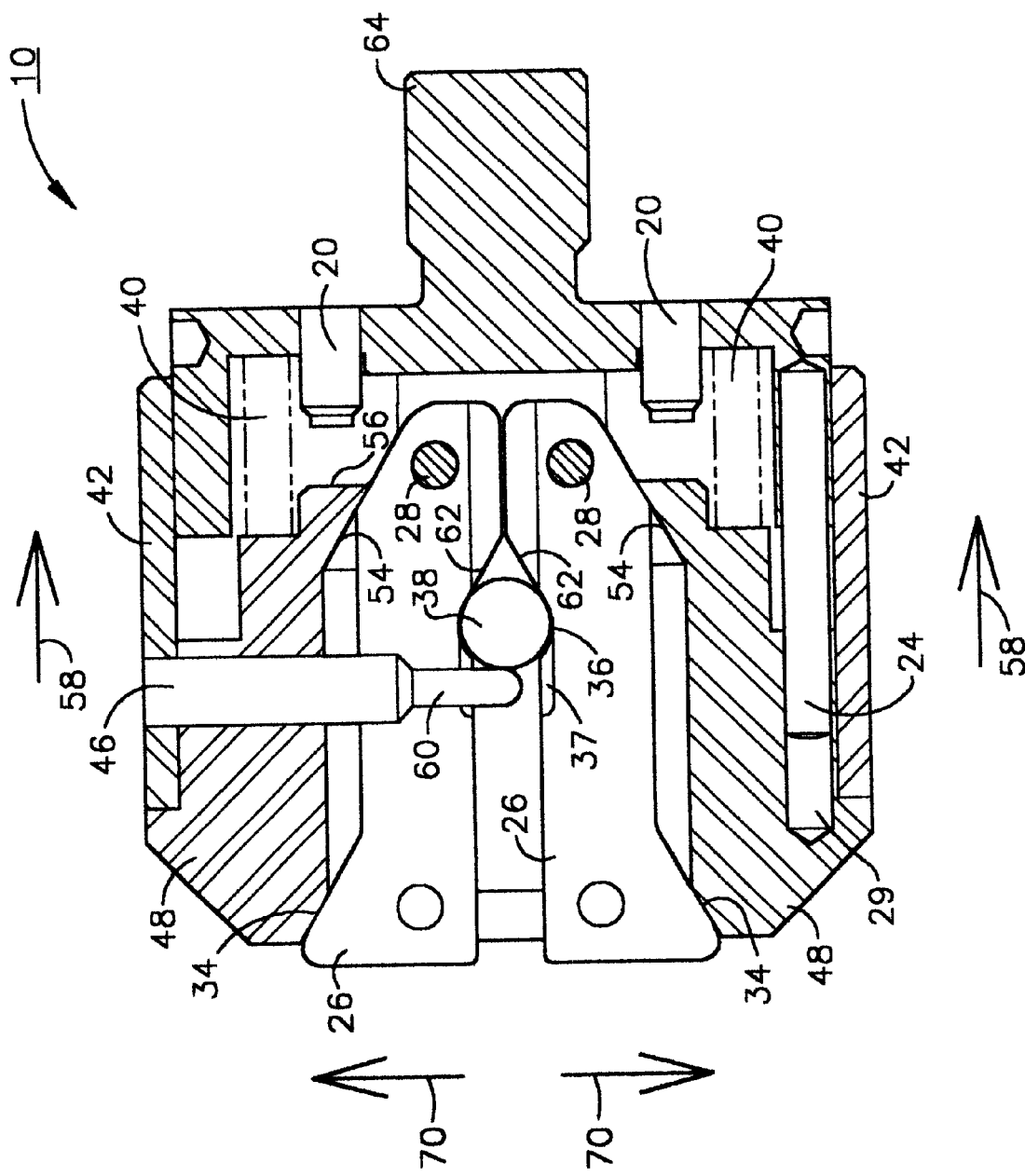
FIG. 2 is a cross-sectional view of a preferred embodiment of the gripping device of the present invention showing all of the essential operating parts for this embodiment.
Figure 3:
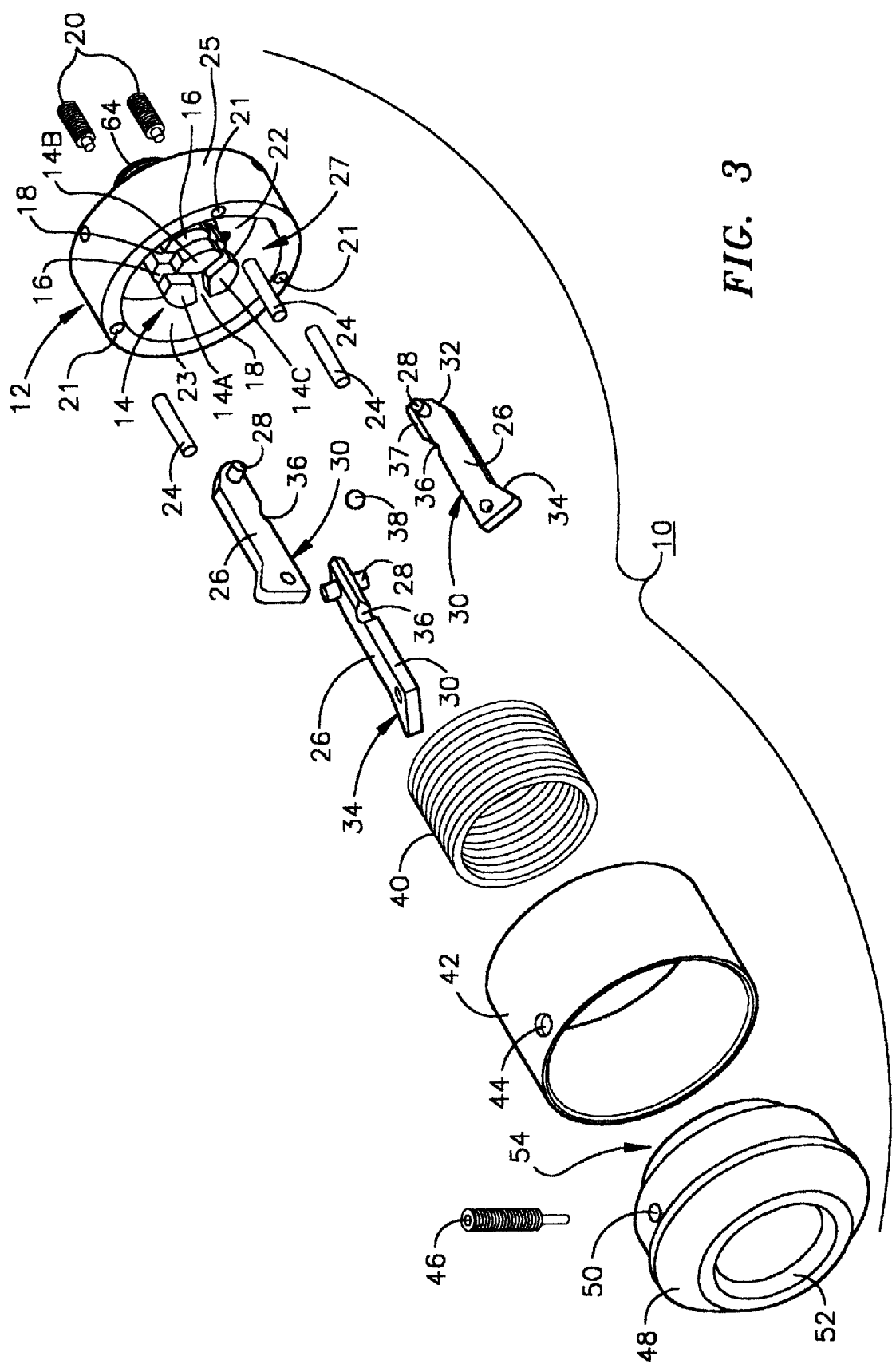
FIG. 3 is an exploded view of a preferred embodiment of the gripping device of the present invention.

Referring now to FIGS. 2 and 3 that respectively show a random cross-sectional view and an exploded view of one preferred embodiment of the gripping device 10 of the present invention, gripping device 10 comprises: a circular base 12 having a rear wall 22, an open front 23 and a peripheral wall 25 that together with rear wall 22 define an open interior 27; a finger mounting tower 14 including pin slots 16 and finger slots 18; a pair of set screws 20 that screw into rear wall 22 of base 12; guideposts 24 that are inserted into apertures 21 in peripheral wall 25 and registered apertures 29 (see FIG. 2) in cylindrical finger guide 48; a plurality of fingers 26 each having a pin 28 mounted therethrough, a gripping surface 30, sliding surfaces 32 and 34 and ball receipt recess 36; spherical ball 38 contained in spherical ball receipt recesses 36; a circular spring 40 that fits into open interior 27 of circular base 12 about and concentric with finger mounting tower 14 about fingers 26; a collar 42 that encloses spring 40, fingers 26, guide posts 24 and fits moveably about the periphery of wall 25 and includes an aperture 44 for insertion of assembly and ball retention pin 46; and finally, cylindrical finger guide 48 having a collar portion 42 and incorporates aperture 50 for receipt of threaded ball retention pin 46 and provides finger bearing surfaces 52 and 54, the latter being shown only in FIG. 2. According to the preferred embodiment depicted in FIGS. 1–4 a threaded male connector 64 is provided for attachment of gripping device 10 to an appropriate tool mounting system.

In further detail, base 12 contains finger mounting tower 14 that provides horizontal pin slots 16 and vertical finger slots 18 that begin at the interior surface of rear wall 22 and extend to the top of finger mounting tower 14 thereby providing three individual tower sections 14a, 14b and 14c. In its assembly, as described in further detail hereinafter, fingers 26 are oriented in finger slots 18 and pins 28 slid into pin slots 16 thereby permitting fingers 26 to slide toward and away from the centerline of base 12 without falling out.

Guideposts 24 serve to maintain proper alignment between base 12 and its associated members and cylindrical finger guide 48 and its associated members. Quite clearly, guideposts 24 must fit into apertures 29 in a fashion that permits axial movement of base 12 and cylindrical finger guide 48 relative to one another as described herein. Consequently, apertures 29 must be of a length to accommodate such axial movement.

Spherical ball receipt recesses 36 have an elongated shape as best seen in FIG. 2. Spherical ball receipt recesses 36 are preferably wide at their forward end, that end closest to gripping surfaces 30, to allow introduction of spherical ball 38 as described below during assembly but have uniformly angled surfaces 62 in their rearward portions, those proximate finger mounting tower 14 so as to permit spherical ball 38 to move rearward toward end wall 22 during operation as described below. While the angle of angled surfaces 32, 34, 52, 54, and 62 may be varied considerably depending upon the gripping capacity and the size of gripping device 10, an angle of between about 20 and 40 degrees is generally acceptable with an angle of about 30 degrees being preferred.

Spring 40 which, as described hereinafter, provides gripping device 10's gripping pressure, may comprise any of a number of conventional spring configurations such as wire coil springs etc, but it is specifically preferred that spring 40 be a continuous spiraling wave spring of the type recognized in the art that applies pressure in a continuous spiraling wave. Such a spring imparts maximum pressure for a given minimal diameter and depth while providing excellent performance for long periods of time during high speed loading and unloading operations.

While annular finger guide 48 and collar 42 are depicted in FIG. 3 as separate parts, they may comprise a single assembly if the appropriate bearing surfaces can be provided as described below. Also, as described in connection with the detailed description of spherical ball recesses 36, surfaces 32 and 34 and 52, 54 and 62 may be angled within a wide range depending upon the configuration of gripping device 10. Quite clearly all of these angles should be of mating proportions to permit smooth and uniform operation of gripping device 10, and angles of between about 20 and about 40 degrees are acceptable therefor with angles of about 30 degrees being specifically preferred. As will be apparent to the skilled artisan, whatever angle is selected for these various parts, all of the angles should be the same to assure smooth operation of the device.

When assembled, gripping device 10, has the configuration best shown in random cross-section in FIG. 2. Assembly is accomplished as follows, cylindrical finger guide 48 is inserted into collar 42 so that apertures 44 and 50 are in registration forming a first assembly section. Spring 40 is located in open front 23 inside of and adjacent to peripheral wall 25 and bearing against rear wall 22. Guideposts 24 are inserted into apertures 21, the first assembly section described above, oriented facing base 12 and guideposts 24 aligned with apertures 29 therein. The entire assembly is then mechanically compressed, in the direction shown by arrows 58 in FIG. 2, against the force of spring 40. At sufficient compression, virtually complete compression, such that the rear annular rim 56 of annular finger guide 48 is adjacent to rear wall 22, fingers 26 are individually inserted such that pins 28 engage pin slots 16 and fingers 26 engage finger slots 18. Spherical ball 38 is then deposited into ball receipt recesses 36, ball retention pin 46 is then screwed into registered apertures 44 and 50 and compression pressure released. At this time, sliding surfaces 32 and 34 on fingers 26 are in contact with finger bearing surfaces 52 and 54 and the assembly is complete except for the insertion of set screws 20 into rear wall 22. The purpose of set screws 20 is determined by their length which must be sufficient to limit the travel of annular finger guide 48 backward, i.e. in the direction of arrows 58 in FIG. 2, beyond a point where fingers 26 could be accidentally or unintentionally removed from the assembly in the reverse of the assembly operation just described. Of course, the removal of set screws 20 is the first step in the intentional disassembly of gripping device 10 for purposes of changing fingers 26 or otherwise servicing the device. Chamfered surface 37 is provided on fingers 26 to provide clearance for tip 60 when fingers 26 are in close proximity in a "tight" gripping situation.

In operation, the first assembly comprising collar 42, cylindrical finger guide 48 and ball retention pin 46 is compressed mechanically or robotically in the direction of arrows 58. As this action occurs, it will be apparent to the skilled artisan that tip section 60 of ball retention pin 46 will force spherical ball 38 in the direction of arrows 58 causing fingers 26 to be driven apart as, spherical ball 38 engages slanted portions 62 of ball receipt recesses 36. Simultaneously with such application of force, sliding surfaces 32 and 34 move along finger bearing surfaces 52 and 54, fingers 26 slide radially in finger slots 18, and pins 28 slide radially in pin slots 16. This action results in fingers 26 to move relatively outwardly, i.e. longitudinally, from annular finger guide 48 and associated gripping surfaces 30 to move perpendicularly away from the center line, i.e. radially, of gripping device 10 in the direction indicated by arrows 70 in FIG. 2. In this configuration presented in FIG. 4, gripping device 10 is in condition for receipt of a workpiece to be inserted between gripping surfaces 30. Upon release of compression pressure upon spring 40 directed in the direction of arrows 58, the first assembly comprising cylindrical finger guide 48, collar 42 and threaded spherical ball retention pin 46 are forced in the direction of arrow 66 in FIG. 1 by the action of spring 40 allowing ball 38 to move forward in recesses 36 while surfaces 52 and 54 bear against surfaces 32 and 34 causing fingers 26 to withdraw into cylindrical finger guide 48 and associated gripping surfaces 30 to collapse perpendicularly upon any workpiece inserted therebetween. Such a configuration, absent a workpiece, is shown in FIG. 1.

Gripping device 10 has been depicted and described according to a preferred embodiment that utilizes three fingers 26. As will be apparent to the skilled artisan, the basic invention of utilizing a centrally mounted ball to force apart perpendicularly gripping surfaces upon the application of longitudinal pressure could be utilized with as few as two and upwards of three fingers having gripping surfaces capable of engaging a workpiece with gripping surfaces of varying sizes and shapes. Accordingly, all such modifications are intended to be within the scope of the appended claims.

As will be further evident to the skilled artisan, a number of variations can be made to the structure described herein to achieve a similar although somewhat result. For example, spring 40 could be located about the exterior of base 12, if some appropriate mechanism were provided to retain it. In fact, spring 40 could be dispensed with entirely, if some other, but obviously more cumbersome activator for pin 46 were applied externally to the surface of gripping device 10. The structure of finger mounting tower 14 could be changed to another structure that provides a mechanism for slideably retaining fingers 26. The essential elements of gripping device 10 are the presence of spherical ball 38 in ball recess 36 and angular recess 62 in fingers 26 and a means such as pin 46 to drive fingers 26 apart in a guided fashion so that gripping surfaces 30 move perpendicularly away from the centerline of gripping device 10 when pin 46 is activated and return to a "closed" position through the application of internally or externally applied pressure in the opposite direction.

While gripping device 10 may be fabricated from any acceptable material including but not limited to metals and plastics, conventional tool steel and high strength steels have been found to be fully acceptable materials of construction for high volume and extended use operation with the former being specifically preferred for ease of machining and cost reasons.

There has thus been described, a gripping device that by virtue of its design and construction can engage a workpiece inserted therein with a virtually entirely perpendicular engagement motion thereby eliminating any sliding motion and the possibility of any damage to the inserted workpiece.

As the invention has been described, it will be apparent to those skilled in the art that the same may be varied in many ways without departing from the spirit and scope of the invention. Any and all such modifications are intended to be within the scope of the appended claims.

What is claimed is:

1. A gripping device comprising:
    A) a cylindrical finger guide having an entry and an exit end, angled finger bearing surfaces about the interior of both said entry and said exit ends and a ball retention pin aperture therethrough and further including a collar extending beyond said exit end;
    B) a base having a rear wall, a peripheral side wall and an open front all defining an open interior having a centerline, said open interior containing a centrally located finger mounting tower about said centerline and having horizontal pin slots and vertical finger slots;
    C) a plurality of fingers each having:
        i) a gripping end including a gripping surface on an interior side facing said centerline;
        ii) an oppositely located mounting end including a transversely located pin that engages said mounting tower;
        iii) on said interior side intermediate said gripping end and said oppositely located mounting end an angled spherical ball receiving recess;
        iv) an exterior side opposite said interior side having angled sliding surfaces at both ends thereof that each slidingly engaging one of said finger bearing surfaces;
    E) a ball retention pin in said ball retention pin aperture and having a tip in contact with a spherical ball; and
    F) a generally circular spring within said open interior and said collar, concentric with said centerline and bearing against said rear wall and said cylindrical finger guide in a fashion to force said ball retention pin away from said rear wall.

2. The gripping device of claim 1 wherein said generally circular spring applies pressure in a continuous spiraling wave.

3. The gripping device of claim 1 further including a plurality of guideposts extending from said peripheral wall into said cylindrical finger guide to maintain proper alignment therebetween.

4. A gripping device having a centerline and comprising:
    A) a plurality of fingers each having:
        i) a gripping end including a gripping surface on an interior side facing said centerline;
        ii) an oppositely located mounting end including a transversely located pin that engages a mechanism for slideably retaining said pin and said fingers;
        iii) on said interior side intermediate said gripping end and said oppositely located mounting end an angled spherical ball receiving recess;
        iv) an exterior side opposite said interior side having angled sliding surfaces at both ends thereof; that each slidingly engaging one of said finger bearing surfaces;
    B) a mechanism for engaging said angled sliding surfaces and guiding said fingers in a perpendicular direction relative to said centerline and further including a sidewall and a ball retention pin aperture through said sidewall;
    C) a spherical ball in said angled spherical ball receiving recesses;
    D) a ball retention pin in said ball retention pin aperture, said ball retention pin having a tip that engages said spherical ball; and
    E) a mechanism for applying pressure to said mechanism for engaging said angled sliding surfaces so as to force said mechanism for engaging said angled sliding surfaces away from said mechanism for slideably engaging said fingers and said pins.

5. The gripping device of claim 4 wherein said mechanism for slideably retaining said pin and said fingers comprises a base concentric with said centerline and having a peripheral wall, an open interior and a rear wall and said mechanism for applying pressure to said mechanism for engaging said angled sliding surfaces comprises a generally circular spring within and about said open interior and within said collar, concentric with said centerline and bearing against said rear wall and said cylindrical finger guide in a fashion to force said ball retention pin away from said rear wall.

6. The gripping device of claim 5 wherein said generally circular spring applies pressure in a continuous spiraling wave.

7. The gripping device of claim 4 wherein said mechanism for engaging said angled sliding surfaces and guiding said ringers comprises:
    a cylindrical ringer guide having an entry an exit end and a sidewall, angled finger bearing surfaces about the interior of both said entry and sa id exit ends and a ball retention pin aperture through said sidewall and further including a collar portion extending beyond said exit end.

8. The gripping device of claim 4 wherein said mechanism for slideably retaining said pin and said fingers comprises a base having a rear wall, a peripheral side wall and an open front all defining an open interior having a centerline, said open interior containing a centrally located finger mounting tower about said centerline and having horizontal pin slots and vertical finger slots.

9. The gripping device of claim 5 further including a plurality of guideposts extending from said peripheral wall into said mechanism for engaging said angled sliding surfaces.

* * * * *